April 26, 1966  M. T. GILLILAND  3,248,516
VARIABLE FEED DEVICE AND CONTROL THEREFOR
Filed Aug. 1, 1963  3 Sheets-Sheet 1

INVENTOR.
MALCOLM T. GILLILAND

BY *Newton, Hopkins & Jones*

ATTORNEYS

April 26, 1966   M. T. GILLILAND   3,248,516
VARIABLE FEED DEVICE AND CONTROL THEREFOR
Filed Aug. 1, 1963   3 Sheets-Sheet 2

INVENTOR.
MALCOLM T. GILLILAD
BY
Newton, Hopkins & Jones
ATTORNEYS

April 26, 1966   M. T. GILLILAND   3,248,516
VARIABLE FEED DEVICE AND CONTROL THEREFOR
Filed Aug. 1, 1963   3 Sheets-Sheet 3

INVENTOR.
MALCOLM T. GILLILAND
BY
Newton, Hopkins & Jones
ATTORNEYS

United States Patent Office 3,248,516
Patented Apr. 26, 1966

3,248,516
VARIABLE FEED DEVICE AND CONTROL
THEREFOR
Malcolm T. Gilliland, 3249 Linfield Drive SW.,
Atlanta, Ga.
Filed Aug. 1, 1963, Ser. No. 299,431
3 Claims. (Cl. 219—130)

This invention relates to welding apparatus, and is more particularly concerned with a variable feed device for an electric arc welder.

In electric arc welding, a substantially continuous wire is frequently used as both an electrode and filler rod. The wire and a gas to envelop the rod and provide a gas shield at the point of the weld are both generally fed from the welding torch and the welding arc extends between the work and the end of the wire. The wire is wound on a reel and is fed by mechanical means to the welding torch as needed.

In previous electric arc welding devices, the wire has been fed at a constant rate. However, the position of the torch varies because of unavoidable motion of the operator's hand. Since the welding arc extends between the end of the wire and the work, this motion of the torch and the constant wire feed rates result in the length of the arc varying. This is undesirable if proper welding is to be obtained.

Attempts to solve this problem in welding devices using small wire and high feed rates have not been previously successful. Moreover, previous welding devices have been characterized by a tendency for the gas shield to be blown away when the welding is being done in a windy area.

The device of the present invention overcomes these and other electric arc welding difficulties by providing a wire feeding means and an electric arc welding torch which together vary the rate of feed of the wire in accordance with changes in the relative position of the torch with respect to the work. This varying feed rate of the wire maintains the end of the wire at a constant distance from the work as the torch moves. This results in a constant arc length and in improved welding. The wire feeding means is very quickly responsive through a very wide range of feeding speeds, and will feed the wire at both low and high average rates of speed. In addition, the present device utilizes gas flowing at high rates of flow and baffles in the nozzle to cause a gas turbulence at the work and provide a good gas shield even in windy areas.

These and other features and advantages of the present invention will become apparent from consideration of the following specification when taken in conjunction with the accompanying drawings in which.

Figure 1:
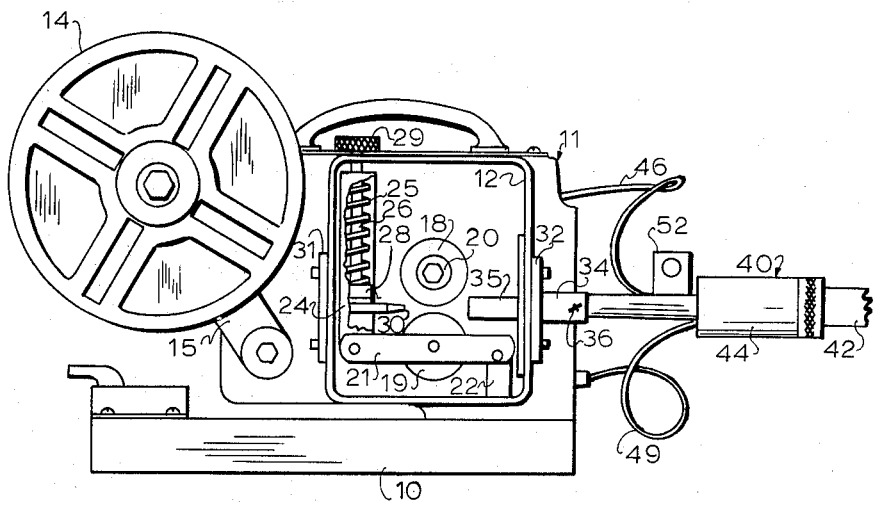
FIG. 1 is a side elevational view of the feed device of the present invention.

Referring now more particularly to the drawings, and to that embodiment here chosen by way of illustration, the device shown in FIGS. 1-4 includes a base 10 which supports a substantially rectangular body 11. On one side of the body 11 there is a rectangular housing 12 which has one side open. The housing 12 contains the driving apparatus for forcing the wire to and through the torch.

A reel 14 is rotatably mounted on an arm 15 pivotally secured to the side of the body 11. The reel 14 is positioned so that it is longitudinally aligned with the housing 12 and wire is fed from the reel 14 directly into the housing 12.

The housing 12 contains a drive roller 18 located substantially centrally of the housing 12 and a pressure roller 19 mounted directly under the drive roller 18 in the housing 12. The drive roller 18 is mounted on a shaft 20 which protrudes from the body 11 and the pressure roller 19 is rotatably carried by a substantially horizontal arm 21. The arm 21 is pivotally mounted at one end on a stationary block 22 and its other end is attached to a tensioning link 24.

The tensioning link 24 has a hollow central portion which contains a spring 25. A screw 26 extends through the housing 12, through the center of the spring 25, and engages a threaded block 28. The screw 26 has a knob 29 at its upper end and it will be seen that, as the screw 26 is rotated by the knob 29, the block 28 moves up or down depending upon the direction of rotation. Upward motion of the screw 26 compresses the spring 25 and causes the link 24 to move upwardly. This raises one end of the arm 21 and moves the pressure roller 19 closer to the drive roller 18. The spring 25 permits the pressure roller 19 to move away from the drive roller 18 under pressure greater than that exerted by the spring 25.

At the left side of the housing 12, as viewed in FIG. 1, is a mounted plate 31 which carries a tube 30 projecting into the housing 12. A hole (not shown) in the plate 31 registers with a hole (not shown) in the tube 30 and wire from the reel 14 passes through the plate 31 and the tube 30 into the housing 12. The tube 30 is positioned within the housing 12 so that wire from the tube 30 extends into the space between the rollers 18 and 19. The tube 30 may be made of nylon or other suitable known material.

On the right side of the housing 12, as viewed in FIG. 1, a plate 32 is mounted. The plate 32 is similar to plate 31 and the plate 32 carries a tube 34 which extends outwardly from the housing 12. The tube 34 receives another tube 35 which is held in position within the tube 34 by a set screw 36. The tube 35 receives the wire from between the rollers 18 and 19 and guides the wire through the housing 12 and plate 32 and into the torch assembly 40.

Figure 2:
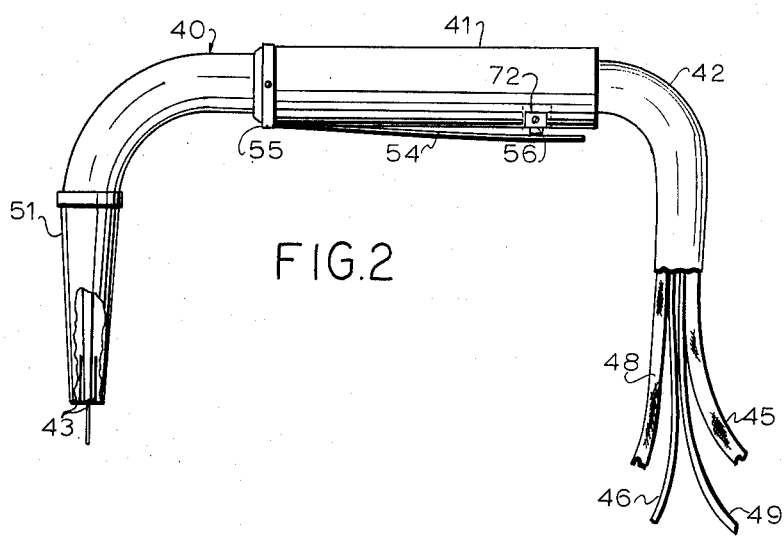
FIG. 2 is an enlarged side elevational view of the torch of the present invention.
Figure 3:
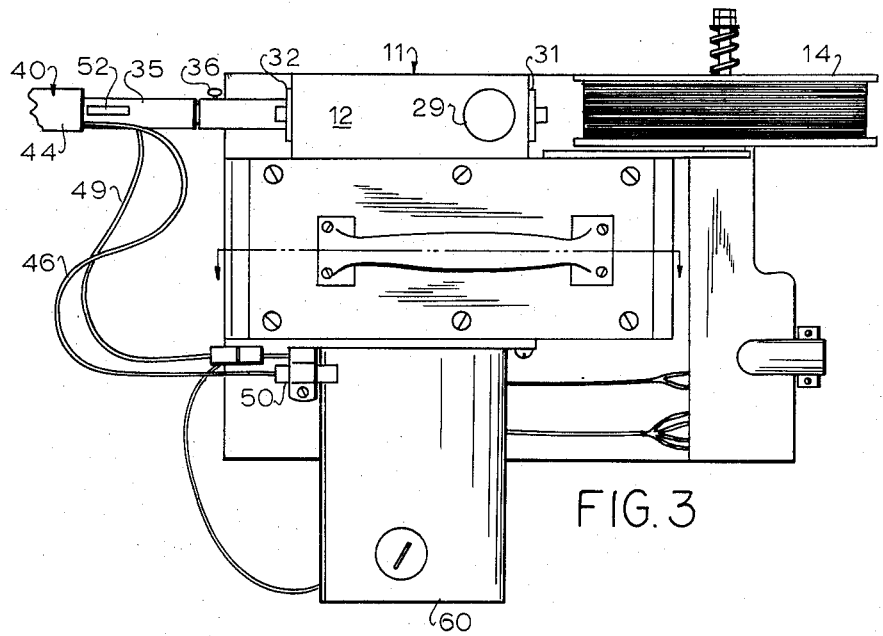
FIG. 3 is a top plan view of the feed device shown in FIG. 1.
Figure 4:
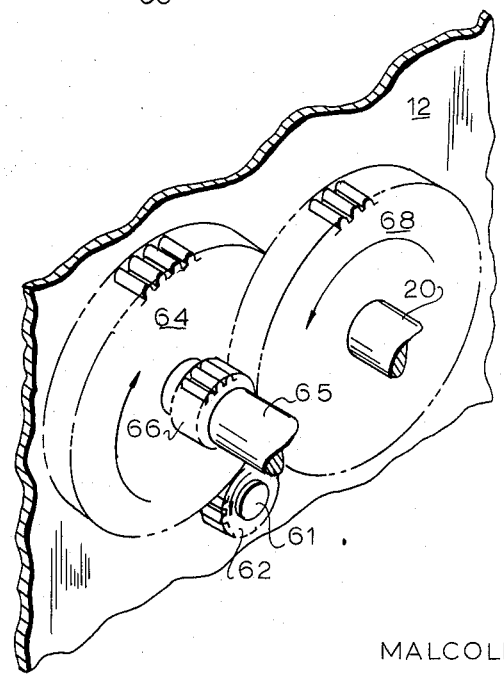
FIG. 4 is a perspective view showing the gear train used in the feed device.

The torch assembly 40 has a hand piece 41 connected to a fitting 44 by a flexible sheath 42. The tube 35 extends into and supports the fitting 44. As shown in FIG. 2, the sheath 42 contains an insulated electrical conductor 45 for the welding current, a hose 46 for gas, a tube 48 for the wire, and a cable 49 for control wires. The tube 48 is continuous within the fitting 44 with the tube 35 so as to provide a continuous tube for the wire from within the housing 12 to the nozzle 51.

The gas hose 46 runs from gas fitting 50 of known type through the fitting 44, through the sheath 42, and through the hand piece 41 so as to provide a supply of gas at the nozzle 51 from a known source of gas (not shown) connected to the gas fitting 50. The hose 46 is of sufficient diameter and the gas is under sufficient pressure to provide a high rate of gas at nozzle 51 when a gas valve (not shown) is opened. The conductor 45 is attached to the tube 35 inside the fitting 44 and welding current is provided in a manner to be described through a lug 52 which is also attached to the tube 35.

On the hand piece 41 is a trigger 54 attached at 55. The extending end of the trigger 54 bears against the operating button 56 of a microswitch 72. Hence, the trigger 54 provides a convenient means for operating the microswitch 72 and the function of the microswitch will be discussed hereinafter. Baffles 43 mounted within the nozzle 51 diffuse the gas entering the nozzle 51 through the gas hose 46 and with the high rate of gas flow create a gas turbulence at the work which provides an effective gas shield in the wind.

The body 11 contains the gear train to rotate the drive roller 18. An electric motor 60 is secured to the opposite side of the body 11 from the housing 12. The shaft 61 of the motor 60 projects through the side of the body 11 and within the body 11 carries a gear 62. The gear 62 meshes with a larger gear 64 which is carried on a shaft 65 journaled in the sides of the body 11. A small gear 66 is mounted on the shaft 65 beside the gear 64, and the gear 66 meshes with a larger gear 68 fixedly mounted on the shaft 20. The shaft 20 is journaled in the body 11 and carries the drive roller 18 on its end, as described above.

The gear train provides mechanical efficiency not possible with a worm gear. Although a worm gear will allow the same speed reduction with fewer gears the drive of a worm gear is largely sliding contact. In the gear train of the invention, the sliding contact between the gears is at a minimum. The resulting mechanical efficiency permits the speed of the motor 60 to be responsive to small signals and the gear train is particularly suited to the control means to be described.

Figures 5, 6:
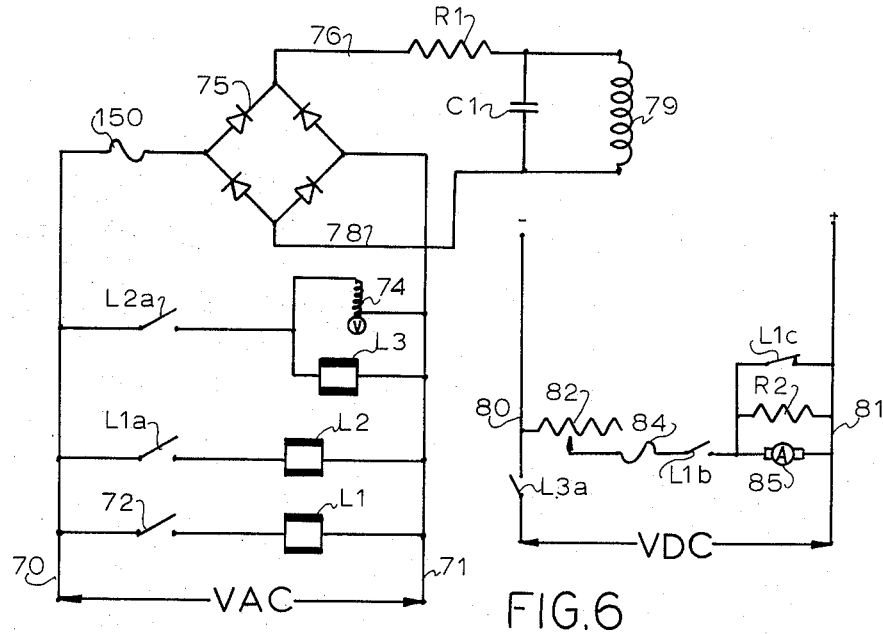
FIG. 5 is a schematic wiring diagram of a control circuit of the present invention.
FIG. 6 is a schematic wiring diagram of a modified form of control circuit.

Attention is now directed to FIG. 6 of the drawings which shows one embodiment of the control circuit for the device described above. The circuit is used with conventional welding power supply equipment which has an alternating current voltage and a direct current voltage. The direct current voltage is the supply for the actual welding, and the alternating current voltage is for control and other purposes.

An alternating current voltage is impressed between the wires 70 and 71. A relay L1 is connected in series with the microswitch 72 between the wires 70 and 71, the microswitch 72 being operated by the trigger 54. Also between the wires 70 and 71 is a relay contact L1a in series with a relay coil L2, and a relay contact L2a in series with a parallel circuit containing a contactor coil L3 and a solenoid operated valve 74.

The wires 70 and 71 lead through a fuse 150 to a full wave rectifier 75 which produces in known manner a direct voltage on the wires 76 and 78. The wire 76 has a resistor R1 and on the opposite side of the resistor R1 from the rectifier 75 is a capacitor C1 across the wires 76 and 78. The field coil 79 of the motor 60 is in parallel with the capacitor C1.

The direct current voltage is impressed between wires 80 and 81 and a contactor contact L3a is in the wire 80. Between the wires 80 and 81 there is a series circuit containing a rheostat 82, a fuse 84, a relay contact L1b and the armature 85 of the motor 60. Parallel with the armature 85 are relay contact L1c and resistor R2. The welding electrodes are attached between the wires 80 and 81.

When the trigger 54 is depressed, the microswitch 72 is closed. This energizes relay coil L1 which causes the contact L1a to close and energize the relay coil L2. The relay L2 is a time delay relay and although any known type of time delay will operate satisfactorily, it has been found that a pneumatic time delay relay of known type provides good response and is rigid and durable enough for the particular application.

After the delay preset into the time delay relay L2, the relay contact L2a will close, energizing both contactor coil L3 and solenoid valve 74. The solenoid valve 74 controls the flow of the gas used for the shield around the electrode, and the relay L3 closes the contactor L3a in the D.C. circuit as will be discussed later.

It will be seen that, as soon as a voltage is impressed on the wires 70 and 71, the rectifier 75 is energized. The rectifier 75, in turn, energizes the field coil 79. Thus, the field coil 79 is energized at all times during operation of the device. The resistor R1 causes a voltage drop which provides the correct voltage for the field coil 79 and the capacitor C1 smooths out the pulsating direct current output of the rectifier 75.

Referring now to the direct current circuit, the contactor L3a is closed when the contactor coil L3 is energized and places a voltage across the welding circuit including the armature 85. The rheostat 82 allows adjustment of the voltage so that the average speed of the motor 60 can be set as desired. The resistor R2 is in series with the rheostat 82 when the contact L1b is closed and the combination of the rheostat 82 and the resistor R2 acts as a potentiometer which provides a more sensitive control for the motor 60 than the rheostat 82 alone would provide.

When the device of the invention is operated, the supply voltages are impressed on the circuits and the field coil 79 is energized immediately. However, the armature 85 is not energized since the contactor L3a is open until the trigger 54 is depressed. Then the trigger 54 is depressed, the relay L1 is energized and the relay L1 closes contact L1a to energize relay L2, closes contact L1b, and opens contact L1c. When relay L2 is energized, contact L2a is closed, after a time delay, to energize both relay L3 and solenoid 74. The energizing of solenoid 74 allows gas to flow through the nozzle 51 so as to provide a gas shield around the welding wire. The energizing of the relay L3 closes contact L3a to energize the armature 85. Since the field coil 79 is already energized, the motor 60 will start to rotate when the armature 85 is energized. The motor 60 acts through the gear train described above to rotate the drive roller 18 and feed wire through the nozzle 51.

When the welding wire is placed close to the work, there is an almost direct short across the wires 80 and 81. This lowers the resistance between the welding wire acting as an electrode and the second electrode (not shown) attached to the work and increases the current between wires 80 and 81 through the welding wire. The conventional generator for arc welders is such that, as the generator is loaded, the voltage will drop. This drop in voltage is characteristic of most generators and is understood by those skilled in the art. The result is that as the welding wire is brought close to the work, the voltage between wires 80 and 81 drops.

The motor 60 is a shunt motor and its speed is almost directly proportional to the armature current. Since the current through a fixed resistance is directly proportional to the voltage, when the voltage decreases as a result of the welding wire moving close to the work, the current in the circuit containing the armature 85 decreases and the speed of the motor 60 decreases to give a slower rate of feed of the welding wire.

Conversely, when the welding rod is moved away from the work, the resistance across the arc between the welding wire and the work increases. This reduces the current and causes the voltage of the conventional generator increase in known manner. The resulting increase in voltage across the wires 80 and 81 raises the voltage in the circuit including the armature 85. For the reason discussed above, the motor 60 runs faster to provide a higher rate of feed of the welding wire.

It will thus be seen that, with one setting of the rheostat 82, the speed of the motor 60 will vary with the distance of the welding wire from the work. This keeps the end of the welding wire the same distance from the work regardless of back and forth movements of the torch.

When the trigger 54 is released, the microswitch 72 opens. The opening of microswitch 72 de-energizes relay L1, which causes contact L1a to open, contact L1b to open, and contact L1c to close. As soon as relay L1 drops out, the contact L1b opens, the armature 85 is de-energized. Moreover, the armature 85 will be shorted because of the closing of contact L1c. The armature 85 tends to continue to rotate and coast to a stop. However, since the field coil 79 is still energized, the motor 60 will act as a generator and the direct short on the armature 85 causes high currents in the armature 85 which stop it almost immediately in known manner.

Since the relay L2 is a time delay relay, the L2a will delay in opening. Thus, the welding operation continues for a brief time after the trigger 54 has been released. When the contacts L2a and L3a open after the time delay, the gas stops, and welding ceases until the trigger 54 is again depressed. A tank (not shown) in or continuous with the gas hose 45 will provide an accumulation of gas by which gas may be momentarily continued after contact L2a opens if desired.

FIG. 5 shows a modified form of control circuit. This current is used when it is desired to have the gas flow before the welding begins such as when welding in the wind. The resulting initial flow of gas and the turbulence caused by the baffles 43 provides a good gas shield even in the wind.

Line wires 90 and 91 are connected to the source of alternating current voltage. The microswitch 92 is operated by the trigger 54 and is connected in series with a relay L5. When the trigger 54 is depressed, the switch 92 is closed, energizing relay L5. The relay L5 is a time delay relay of known type which has some contacts which delay in closing, and some contacts which close as soon as the relay L5 is energized.

The contact L5a is closed as soon as the relay L5 is energized with the closing of microswitch 92 and when the relay L5a closes, the solenoid valve 94 allows gas to flow through the torch. After a time delay, the contact L5b closes and energizes the relay L6. The relay L5 performs substantially the same functions as the relay L1 in the previously described embodiment of the control circuit. The contact L6a is closed to energize the relay L7, and the contact L6b is closed and the contact L6c is opened in the direct current portion of the circuit exactly as previously described for relay L1.

The relay L7 is a time delay relay of known type having contacts L7a and L7b that delay in opening, but are instantaneous in closing. The purpose of contact L7a will be described later. When the contact L7b closes after a time delay, it energizes the relay L8. The contact L8a is closed by the relay L8 and in turn, closes the circuit to the direct current voltage source.

The wires 90 and 91 energize a full wave rectifier 95 which places a direct current voltage on wires 96 and 98. The direct current circuit from the rectifier 95 includes a resistor R5, a capacitor C2 and the field coil 99, all arranged just as described in the previous embodiment. Moreover, the direct current circuit between wires 100 and 101 for the present embodiment is the same as the circuit between wires 80 and 81 previously described, having the wires 100 and 101, a rheostat 102 in series with a fuse 104, relay contact L6b, and the armature 105 of the motor 60. In parallel with the armature 105 are resistor R6 and contact L6c.

Thus, it will be seen that when the trigger 54 is depressed, the microswitch 92 closes and energizes the relay coil L5. Immediately, the contact L5a closes to energize the solenoid valve 94 and starts the gas flow. After a preset time, the contact L5b closes and energizes the relay L6 which operates its contacts L6a and L6b immediately. Contact L6a energizes the relay L7 to close contact L7a and energize relay L8. Relay L8 closes the contactor L8a to provide welding current. The relay L7 also closes contact L7a which is in parallel with the contact L5a.

When the trigger 54 is released, the microswitch 92 opens and drops the relay L5 and causes contacts L5a and L5b to open. The opening of contact L5a does not stop gas flow because contact L7a is still closed. The opening of contact L5b drops relay L6 which opens contacts L6a and L6b and closes L6c. The opening of L6b and the closing of L6c causes the same braking action of the motor 60 as previously described with respect to the opening of L1b and closing of L1c. Contact L6a drops relay L7. Since relay L7 is a time delay relay, it is only after a preset amount of time that contact L7a opens so as to close the gas valve by dropping solenoid 94. The contact L7b opens after a shorter time delay than the contact L7a and drops relay L8 which in turn opens contact L8a to discontinue the welding currents. Since the contact L8a opens before the contact L7a, the flow of gas continues for a short time after welding has stopped. This, the baffles 43, and the high rate of gas flow provide a gas shield even in relatively windy areas.

It should be understood from the above discussion that the rheostat 82 allows the average rate of wire feed to be varied. If the welding operation requires a high current, the wire will be used rather rapidly, so that the rheostat 82 is adjusted to put a small amount of resistance in series with the armature, giving a high rate of speed. If, on the other hand, the welding operation requires a low current, the wire will be used rather slowly and the rheostat 82 is adjusted to put a large amount of resistance in series with the armature, giving a low rate of speed. The gear train described permits the motor 60 to be operated at relatively low speeds in the range of six hundred revolutions per minute even when high rates of wire feed are obtained and the motor 60 has three times the torque necessary to feed the welding wire under normal conditions. The high torque and low speed of the motor 60 make the motor particularly responsive to changes in armature current and well suited to control by the control circuits described above.

It will be understood that the device here presented is by way of illustration only, and is meant to be in no way restrictive; therefore, numerous changes and modifications may be made, and the full use of equivalents resorted to without departing from the spirit or scope of the invention as outlined in the appended claims.

What is claimed as invention is:

1. In an electric arc welding apparatus in which a wire is fed through a torch, gas is fed through said torch to envelop said wire, a direct current voltage source which drops under high current load and increases under low current load provides the power for the arc, and an alternating current voltage source provides the power for controls, the combination therewith of a switch on said torch; a solenoid valve for controlling said gas; a first circuit means responsive to said switch for energizing said solenoid valve; feed means for feeding said wire, said feed means including an electric motor having an armature in parallel with said arc and a field coil; a rectifier connected to said alternating voltage source, said rectifier being arranged to energize said field coil; a second circuit means responsive to said first circuit means for selectively energizing said armature, the voltage across said second circuit means being directly proportional to the direct current voltage source.

2. In an electric arc welding apparatus in which a wire is fed through a torch, gas is fed through said torch to envelop said wire, a direct current voltage source provides the power for the arc, and an alternating current voltage source provides the power for controls, the combination therewith of feed means for feeding said wire, said feed means including an electric motor having a field coil and an armature; means for energizing said field coil including a rectifier energized from said source of alternating current voltage; means for energizing said armature including a circuit in parallel with said arc; control means for said apparatus including a switch mounted on said torch, a first relay in series with said switch across said source of alternating voltage, a second relay, a relay contact associated with said first relay in series with said second relay, a third relay, a relay contact associated with said second relay in series with said third relay, a solenoid valve controlling said gas and in parallel with said third relay, and a relay contact associated with said third relay in series with the said direct current voltage source.

3. An electric arc welding apparatus in which a wire is fed through a torch, gas is fed through said torch to envelop said wire, a direct current voltage source which drops under high current load and increases under low current load provides the power for the arc, and an alternating current voltage source provides the power for the controls; said torch including a hand piece, a switch on said hand piece, a lever pivotally attached to said hand piece and engaging said switch such that movement of said lever will actuate said switch, a nozzle carried by said hand piece, said nozzle having an inner tube and an outer sheath, baffles between said inner tube and said outer sheath, said inner tube carrying said wire, said outer sheath carrying said gas, said baffles acting to cause turbulence of said gas; feeding means for said wire including a pair of opposed rollers, a spring, said spring acting to urge one of said pair of rollers toward the other of said pair of rollers, an electric shunt wound motor having individual excitation for the armature and the field thereof, a gear train driven by said motor, said gear train being connected to drive said other of said pair of rollers, said wire passing between said pair of rollers to be driven thereby; control means for varying the speed of rotation of said other of said pair of rollers in accordance with said direct current voltage source including a first circuit, said first circuit having said armature of said motor connected in parallel with said direct current voltage source, and a rheostat connected in series with said armature, a second circuit including a rectifier in parallel with said alternating current voltage source, said field coil of said motor being connected in parallel with said rectifier, a relay means connected in parallel with said alternating current voltage source, said switch on said hand piece of said torch being in series with said relay means, a valve to control the flow of said gas, said valve being operable by said relay means, switch means to short-circuit said armature, said switch means being operable by said relay means, the arrangement being such that, when said relay means is energized, said switch means will be opened, and when said relay means is de-energized, said switch means will be closed to short-circuit said armature.

References Cited by the Examiner

UNITED STATES PATENTS

| 1,948,763 | 2/1934 | Koch | 314—69 |
| 2,066,163 | 12/1936 | Stephens et al. | 314—69 |
| 2,488,987 | 11/1949 | Schmerber | 314—73 |
| 2,504,868 | 4/1950 | Muller | 219—130 |
| 2,510,205 | 6/1950 | Baird | 219—130 |
| 2,510,207 | 6/1950 | Behnke et al. | 219—130 |
| 2,517,739 | 8/1950 | Tyrner et al. | 219—130 |
| 2,823,331 | 2/1958 | Bischel et al. | 314—70 |
| 2,843,727 | 7/1958 | Benz et al. | 219—130 |
| 3,009,619 | 11/1961 | Layden | 226—184 |
| 3,016,451 | 1/1962 | Cornell | 219—130 |

RICHARD M. WOOD, *Primary Examiner.*